Aug. 7, 1945.  C. G. FLYGARE  2,381,123
GRINDING MACHINE
Filed May 22, 1944   3 Sheets-Sheet 1
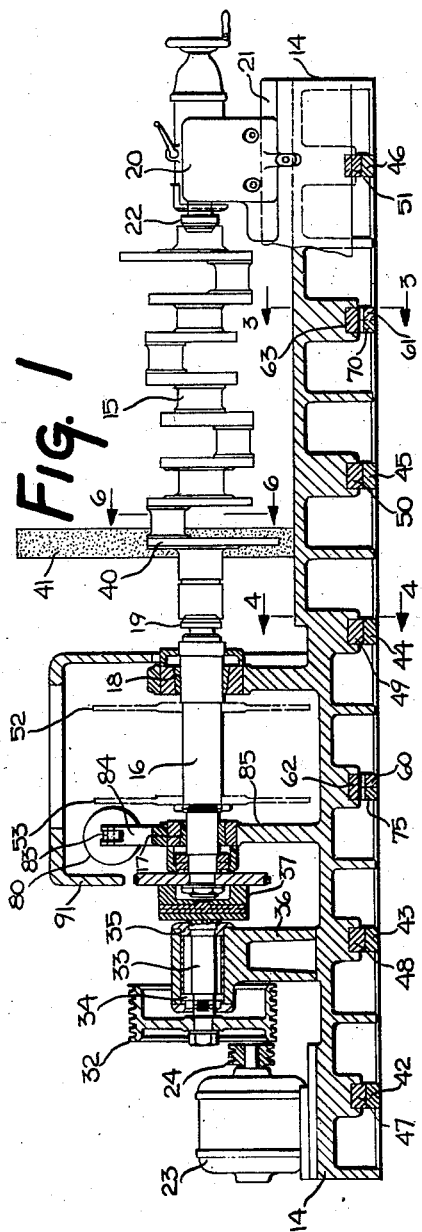
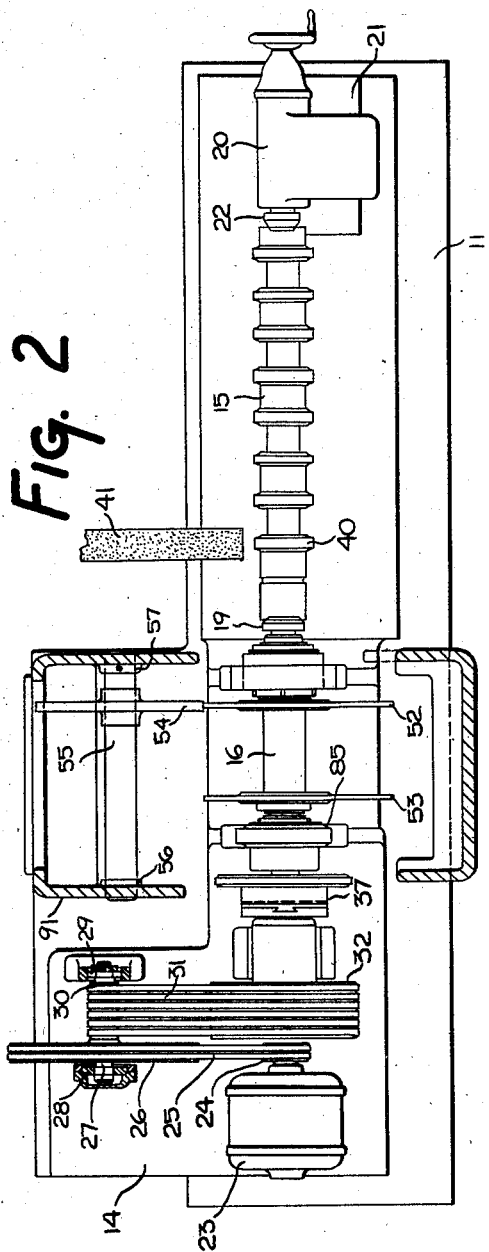
Inventor
CARL G. FLYGARE
By Harold W. Eaton
Attorney Aug. 7, 1945.   C. G. FLYGARE   2,381,123
GRINDING MACHINE
Filed May 22, 1944   3 Sheets-Sheet 2
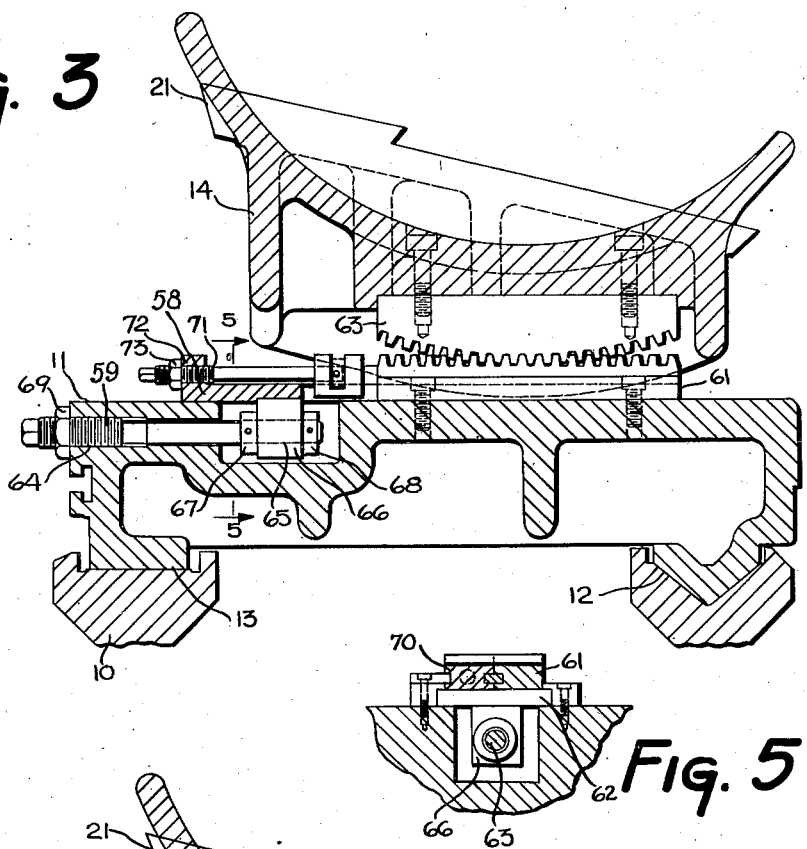
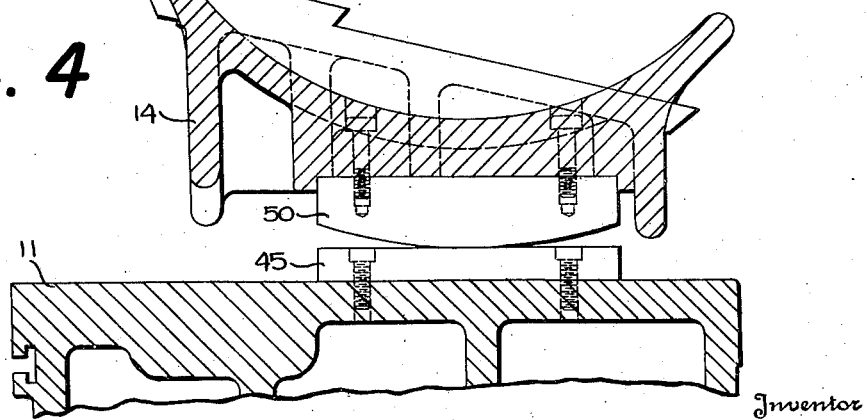
Inventor
CARL G. FLYGARE
By Harold W. Eaton
Attorney Aug. 7, 1945.   C. G. FLYGARE   2,381,123
GRINDING MACHINE
Filed May 22, 1944   3 Sheets-Sheet 3

Inventor
CARL G. FLYGARE
By Harold W. Eaton
Attorney

Patented Aug. 7, 1945

2,381,123

UNITED STATES PATENT OFFICE 2,381,123

GRINDING MACHINE

Carl G. Flygare, Worcester, Mass., assignor to Norton Company, Worcester, Mass., a corporation of Massachusetts Application May 22, 1944, Serial No. 536,666

14 Claims. (Cl. 51—101)

This invention relates to grinding machines, and more particularly to a machine for grinding an irregularly shaped work piece, such as a cam.

One object of the invention is to provide a simple and thoroughly practical grinding machine for grinding irregular, non-circular work pieces. Another object of the invention is to provide a grinding machine with a work support which is movable transversely toward and from the grinding wheel with the axis of the work piece moving always in the same horizontal plane to generate a non-cylindrical or irregular cam-shaped surface on a work piece.

Another object of the invention is to provide a grinding machine with a rocker type work supporting table in which the work supporting table is arranged to rock on cylindrical faces which are concentric with the axis of rotation of the work piece. A further object of the invention is to provide a rotatable work support which is arranged for a rocking movement about rocker surfaces which are formed concentric with the axis of rotation of the work so that the work axis may be moved transversely in a horizontal plane so as to generate irregular or cam-shaped faces on a work piece.

A further object of the invention is to provide means for controlling the rocking motion of the table so that the axis of the rotatable work piece is at all times maintained parallel to the axis of the grinding wheel. Another object of the invention is to provide a rack and gear segment for controlling and positioning the rocking table. A further object of the invention is to provide a transverse adjustment for said rack and gear mechanism to facilitate aligning the axis of the work piece parallel with the axis of the grinding wheel.

A further object of the invention is to provide a two-part rack, one part of which is adjustable relative to the other to eliminate backlash between the rack teeth and a gear segment on the under side of the rocking work support. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

One embodiment of the invention has been illustrated in the accompanying drawings, in which like reference numerals indicate like parts and wherein:

Fig. 1 is a fragmentary longitudinal section through the rocking work supporting table;

Fig. 2 is a fragmentary plan view of the improved grinding machine;

Fig. 3 is a fragmentary sectional view, on an enlarged scale, taken approximately on the line 3—3 of Fig. 1, showing the adjustment for the rack bar;

Fig. 4 is a similar cross-sectional view, on an enlarged scale, taken approximately on the line 4—4 of Fig. 1, showing one of the plane supporting surfaces together with one of the rockers for supporting the rocking work supporting table;

Fig. 5 is a fragmentary sectional view, taken approximately on the line 5—5 of Fig. 3, showing the adjustment for the rack bars;

Figure 6:
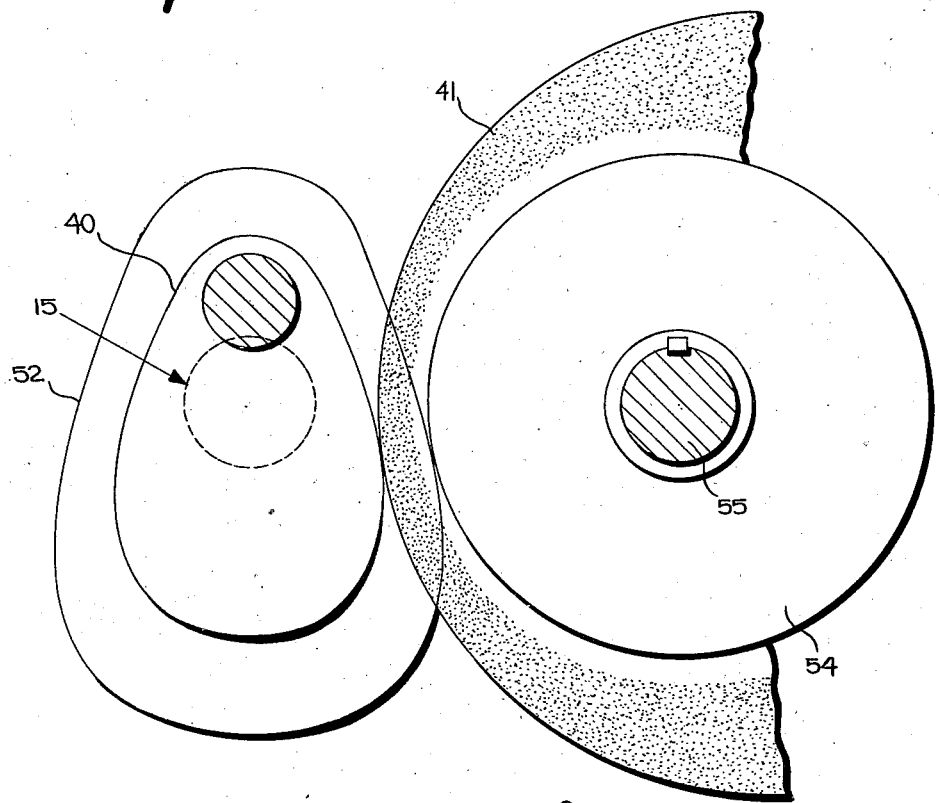
Fig. 6 is a fragmentary diagrammatic view, on an enlarged scale, taken approximately on the line 6—6 of Fig. 1, showing the relationship of the work piece, the grinding wheel, the master cam and the follower roller.

A grinding machine has been illustrated in the drawings comprising a base 10 which supports a longitudinally movable work supporting table 11 on a V-way 12 and flat way 13 formed on the upper surface of the base 10. The table 11 serves as a support for a rocker type work supporting table 14 which serves as a rotatable support for a work piece, such as a crankshaft 15. The rocker table 14 is provided with a rotatable headstock spindle 16 which is journalled in bearings 17 and 18 fixedly mounted on the table 14. The spindle 16 is provided with a headstock center 19 which is arranged to engage and support the left-hand end of the crankshaft 15.

A footstock 20 is adjustably mounted on ways 21 formed on the upper surface of the table 14. The footstock 20 is provided with a footstock center 22 which is arranged to engage and support the right-hand end of the crankshaft 15.

A driving mechanism is provided for rotating the headstock spindle 16 and the crankshaft 15 comprising an electric motor 23 which is mounted on the upper surface of the table 14. The motor 23 is provided with a multi-V-groove pulley 24 which is connected by multiple V-belts 25 with a multi-V-groove pulley 26 which is supported on a rotatable shaft 27. The shaft 27 is journalled in bearings 28 and 29 which are supported in fixed relationship with the table 14. The shaft 27 also supports a multi-V-groove pulley 30 which is connected by multiple V-belts 31 with a multi-V-groove pulley 32 which is supported on one end of a rotatable shaft 33. The shaft 33 is supported in bearings 34 and 35 carried by a bracket 36 which is fixed to the upper surface of the table 14. A universal drive connection 37 is provided between the shaft 33 and the headstock spindle 16 whereby rotary motion of the motor 30 may be imparted through the belt drive above described to rotate the headstock spindle 16 and the crankshaft 15.

The grinding machine as illustrated is particularly intended for grinding an irregular cam-shaped surface 40 forming the periphery of the crank arm of the crankshaft 15. A rotatable grinding wheel 41 is provided which is supported on the usual and well known transversely movable wheel slide (not shown). This wheel slide may be substantially the same as that shown in the expired U. S. Patent to Norton No. 762,838 dated June 14, 1904, to which reference may be had for details of disclosure not contained herein.

In order to facilitate a transverse movement of the work axis relative to the grinding wheel 41 during the grinding operation to generate a controlled shape on the surface 40, the longitudinally movable work supporting table 11 is provided with a plurality of supporting blocks 42, 43, 44, 45 and 46 each of which is provided with a plane upper surface. The under side of the rocker type table 14 is provided with a plurality of rockers 47, 48, 49, 50 and 51. These rockers are fixedly mounted to the under side of the rocker type table 14 and are provided with aligned rocker surfaces which are concentric with the axis of rotation of the headstock spindle 16 and the work piece 15. All the plane supporting faces formed on the blocks 42, 43, 44, 45 and 46 are in alignment with each other and all the rocker faces formed on the rockers 47, 48, 49, 50 and 51 are aligned with each other and are all concentric with the axis of rotation of the work piece so that when the rocker table 14 is rocked to impart a controlled movement to the work piece relative to the grinding wheel, the axis of the headstock spindle 16 and the axis of rotation of the crankshaft 15 will move in a horizontal plane so that a predetermined relationship is maintained between the work piece and the grinding wheel.

In order to impart a controlled transverse rocking movement of the table 14, the headstock spindle 16 may serve as a master cam spindle to support a plurality of master cams 52 and 53. Only two master cams have been illustrated but in actual grinding practice, one master cam is provided for each face to be ground on the crankshaft 15. A master cam roller 54 is slidably keyed to a rotatable shaft 55 which is journalled in bearings 56 and 57 which are fixedly supported relative to the table 14. In case a plurality of master cams are provided for grinding a plurality of portions on the crankshaft 15, an indexing mechanism may be provided for imparting an automatic indexing movement to the master cam roller 54 which is operated in timed relationship with the traversing movement of the work supporting table 11. This indexing mechanism has not been illustrated in the present case, since it is not considered to be part of the present invention. This indexing mechanism may be substantially the same as that shown in the prior U. S. patent to Trefethen and Belden, No. 1,783,755 dated December 2, 1930, to which reference may be had for details of disclosure not contained herein.

In order to position the axis of the headstock spindle 16 and the axis of rotation of the crankshaft 15 parallel to the axis of rotation of the grinding wheel 14, a suitable controlling and adjusting mechanism may be provided comprising a pair of spaced rack bars 60 and 61 on the table 11 which mesh with a pair of gear segments 62 and 63, respectively, which are fixedly supported on the under side of the rocker table 14. In order to facilitate a transverse adjustment of one of the rack bars 60 and 61, the rack 61 is preferably supported on a slide plate 58 which may be adjusted transversely by means of a screw 59 which is screw threaded into an aperture 64 formed in the table 11. The right-hand cylindrical end portion 65 of the screw 63 passes through an aperture formed in a depending lug 66 formed on the under side of the slide plate 62. A pair of collars 67 and 68, which are arranged on opposite sides of the lug 65, serve to hold the screw against endwise movement relative to the slide 62. A locking nut 69 is provided for locking the screw 59 in adjusted position. The details of only one of these adjusting mechanisms has been illustrated in the present case. The adjusting mechanism for the rack 60 is identical with that just described, consequently it is not deemed necessary to illustrate this second mechanism in detail.

In order to eliminate any backlash between the rack 61 and the gear segment 63, the rack bar 61 is preferably provided in two parts, in which a rack bar 70 is slidably adjusted relative to the rack bar 61 by means of an adjusting screw 71 which is connected at its right-hand end (Fig. 3) to the rack bar 70. The screw 71 is screw threaded through an aperture 72 formed in the slide plate 62. A locking nut 73 is provided for locking the screw 71 in adjusted position. It will be readily apparent from the foregoing disclosure that the backlash between the rack 61 and the gear segment 63 may be readily taken up by adjusting the rack bar 70 relative thereto, after which it is locked in adjusted position. Similarly, a rack bar 75 is associated with the rack bar 60 to take up the backlash between the rack bar 60 and the gear segment 62. The adjusting mechanism for the rack bar 75 is identical with that just described in connection with the rack bar 70, consequently this mechanism has not been illustrated in detail.

Figure 7:
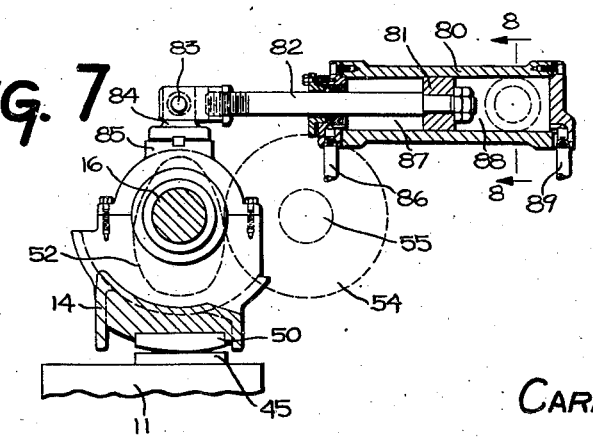
Fig. 7 is a fragmentary cross-sectional view, taken approximately on the line 7—7 of Fig. 1, showing the fluid pressure mechanism for maintaining the master cam in operative contact with the master cam follower roller and also for separating the same.
Figure 8:
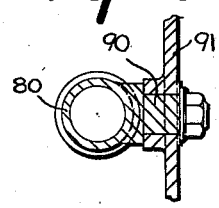
Fig. 8 is a fragmentary cross-sectional view, taken approximately on the line 8—8 of Fig. 7, showing the support for the hydraulic cylinder.

In order to rock the table 14 to move the master cam 52 into or away from operative engagement with the master cam roller 54 and also to maintain the master cam 52 in engagement with the master cam roller 54 during a grinding operation, a hydraulically operated mechanism is provided comprising a fluid pressure cylinder 80. The cylinder 80 contains a slidably mounted piston 81 which is connected to one end of a piston rod 82. The other end of the piston rod 82 is connected by a stud 83 to a bracket 84 which is mounted on the upper end of a bearing supporting arm 85. The arm 85 is fixedly mounted relative to the table 14. Fluid under pressure from a suitable source of supply (not shown) may be passed through a pipe 86 into a cylinder chamber 87 to move the piston 81 toward the right (Fig. 7) so as to cause the table 14 to be rocked to move the master cam 52 into operative engagement with the master cam roller 54. The pressure applied to the cylinder chamber 87 is preferably regulated so as to maintain the master cam 52 in operative engagement with the roller 54 as the master cam 52 rotates so as to impart a controlled movement to the table 14, thereby facilitating the grinding of a predetermined shape on the arm 40 of the crankshaft 15. Fluid under pressure within a cylinder chamber 88 may be exhausted through a pipe 89.

When it is desired to rock the table 14 to an inoperative position so as to separate the master cam 52 and the follower roller 54, fluid under pressure may be admitted to the pipe 89 into the cylinder chamber 88 to move the piston 81 toward the left. A suitable control valve (not shown) may be provided for controlling the admission to and exhaust of fluid from the pipes 86 and 89. Since this control valve is not considered to be a part of the present invention, it has not been deemed necessary to illustrate details of such a valve. The cylinder 80 is preferably provided with a pivotal mount comprising a stud 90 formed integral with the cylinder 80 which is supported by a frame 91. The frame 91 is fixedly supported relative to the table 14.

In setting up the machine for a grinding operation, the axis of the headstock spindle 16 and the axis of rotation of the crankshaft 15 may be readily positioned parallel to the axis of rotation of the grinding wheel 41 by transversely adjusting the rack bars 60 or 61, after which these rack bars are locked in adjusted position. After this adjustment has been made, the rotation of the headstock spindle 16 through the master cam 52 in engagement with the rotatable master cam roller 54 will impart a controlled rocking motion to the table 14, moving the axis of the headstock spindle 16 in a horizontal plane so as to generate a predetermined irregular shape 40 on the crank arm of the crankshaft 15.

The operation of this mechanism will be readily apparent from the foregoing disclosure. A crankshaft 15 to be ground is mounted in position on the headstock center 19 and footstock center 22, after which the rack bars above described are adjusted to eliminate backlash and are adjusted transversely to align the axis of the headstock spindle and the axis of rotation of the crankshaft 15 so that they are parallel with the axis of rotation of the grinding wheel 41. Fluid under pressure is then admitted through the pipe 86 into the cylinder chamber 87 to rock the table 14 so as to move the master cam 52 into operative engagement with the master cam roller 54 and to maintain the master cam 52 in operative engagement with the follower roller 54 during a grinding operation to grind a cam-shaped surface on the work piece. The work drive motor 23 may be set in motion to rotate the headstock or master cam spindle so as to impart a controlled rocking movement to the table 14 through the master cam 52 and the master cam roller 54 to generate the desired shape on the peripheral surface 40 of the crankshaft 15.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base, a rotatable grinding wheel, a longitudinally movable work table, a rocking work support on said table, rocker surfaces between said table and said support, a rotatable work support including a headstock and a footstock on said rocking work support, at least one of said rocker surfaces being concentric with the axis of the headstock and footstock, a master cam and a follower roller to rock said support to facilitate grinding a predetermined contour on a work piece, and means to maintain the axis of the work support in the desired relationship with the axis of the grinding wheel during said rocking movement.

2. In a grinding machine having a base, a rotatable grinding wheel, a longitudinally movable work table, a rocking work support on said table, rocker surfaces between said table and said support, a rotatable work support including a headstock and a footstock on said rocking work support, said rocker surfaces being concentric with the axis of the headstock and footstock, a master cam and a follower roller to rock said support to facilitate grinding a predetermined contour on a work piece, and means to maintain the axis of the work support in the desired relationship with the axis of the grinding wheel during said rocking movement.

3. In a grinding machine having a base, a rotatable grinding wheel, a longitudinally movable work table, a rocking work support on said table, rocker surfaces between said table and said support, a rotatable work support including a headstock and a footstock on said rocking work support, said rocker surfaces being concentric with the axis of the headstock and footstock, a master cam and a follower roller to rock said support to facilitate grinding a predetermined contour on a work piece, means to rock said rocking work support to maintain the master cam in operative engagement with said follower roller during a grinding operation, and means to maintain the axis of the work support in the desired relationship with the axis of the grinding wheel during said rocking movement.

4. In a grinding machine having a base, a rotatable grinding wheel, a longitudinally movable table, a rocking work support on said table, rocker surfaces between said table and said support, a rotatable work support including a headstock and a footstock on said rocking work support, at least one of said rocker surfaces being concentric with the axis of the headstock and footstock, a master cam and a follower roller to rock said support to facilitate grinding a predetermined contour on a work piece, means including a fluid pressure operated piston and cylinder which are operatively connected to rock said rocking work support to move the master cam into operative engagement with the master cam roller and to maintain the desired operating pressure therebetween, and means to maintain the axis of the work support in the desired relationship with the axis of the grinding wheel during said rocking movement.

5. In a grinding machine having a base, a rotatable grinding wheel, a longitudinally movable work table, a rocking work support on said table, plane surfaces on said table, rocker surfaces on said rocking work support which engage said plane surfaces, a rotatable work support including a headstock and a footstock on said rocking work support, a master cam and a follower to rock said support to facilitate grinding a predetermined contour on a work piece, means to maintain the axis of the work support in a predetermined relationship with the axis of the grinding wheel during said rocking movement, and means to adjust the position of said rocking work support so that the axes of the headstock and footstock may be positioned in the desired relationship with the axis of the grinding wheel.

6. In a grinding machine having a base, a rotatable grinding wheel, a longitudinally movable table, a rocking work support on said table, spaced plane surfaces on said table, rocker surfaces on said rocking work support which engage said plane surfaces on the table, rocker surfaces between said table and said support, a rotatable work support including a headstock and a footstock on said rocking work support, a master cam and a follower roller to rock said support to facilitate grinding a predetermined contour on a work piece, means including a horizontally arranged fluid pressure operated piston and cylinder for maintaining the master cam in operative engagement with the master cam roller during a grinding operation, means to maintain the axis of the work support in a predetermined relationship relative to the axis of the grinding wheel during said rocking movement, and means to adjust the position of said rocking work support so that the axes of the headstock and footstock may be adjusted into the desired relationship with the axis of the grinding wheel.

7. In a grinding machine having a base, a longitudinally movable work table, a rocking work support thereon, a rotatable work support including a headstock and a footstock on said rocking work support, plane surfaces on said longitudinally movable table, rocker surfaces on said rocking support which engage said plane surfaces, means including a master cam and a follower roller to rock said table to facilitate grinding a work piece to a predetermined contour, and means to rock said rocking work support so as to maintain said master cam in operative engagement with said follower roller during a grinding operation.

8. In a grinding machine having a base, a longitudinally reciprocable table thereon, a rocking work support thereon, a rotatable work support including a headstock and a footstock center on said rocking work support, plane surfaces on said longitudinally movable table, rocker surfaces on said rocking table engaging said plane surfaces which are concentric with the axis of said centers, means including a master cam and a follower to rock said table, means including a rack bar on said longitudinally movable table, and a gear segment on said rocking work support to control the rocking movement of said support.

9. In a grinding machine having a base, a longitudinally reciprocable table thereon, a rocking work support thereon, a rotatable work support including a headstock and a footstock center on said rocking work support, plane surfaces on said longitudinally movable table, rocker surfaces on said rocking table engaging said plane surfaces which are concentric with the axis of said centers, means including a master cam and a follower to rock said table, means to rock said rocking work support so as to maintain said master cam in operative engagement with said follower roller during a grinding operation, means including a rack bar on said longitudinally movable table, and a gear segment on said rocking work support to control the rocking movement of said support.

10. In a grinding machine having a longitudinally movable table, a rocking work support thereon, a rotatable work support including a headstock and a footstock center on said rocking work support, plane surfaces on said longitudinally movable table, rocker surfaces on said rocking support in engagement with said plane surfaces which are concentric with the axis of said centers, means including a master cam and a follower roller to rock said support, means including a rack bar on said longitudinally movable table and a gear segment on said rocking work support to control the rocking movement of said table, and means to adjust the position of said rack bar relative to said longitudinally movable table to facilitate adjustment of the position of said rocking work support so that the axis of the centers may be positioned in the desired relationship with the axis of rotation of the grinding wheel.

11. In a grinding machine having a longitudinally reciprocable table, a rocking work support thereon, a rotatable work support including a headstock and a footstock center on said rocking work support, plane surfaces on said longitudinally movable table, rocker surfaces on said rocking support which engage said plane surfaces, means including a master cam and a follower roller to rock said support, means including a rack bar on said longitudinally movable table and a gear segment on said rocking table to control the rocking movement of said table, means to adjust the position of said rack bar relative to said table to facilitate adjusting the axis of said centers into the desired relationship with the axis of rotation of the grinding wheel, and an adjustably mounted auxiliary rack bar associated with said rack bar to facilitate elimination of backlash between the rack bar and gear segment.

12. In a grinding machine having a longitudinally movable table, a rocking work support thereon, a rotatable work support including a headstock and a footstock center on said rocking work support, plane surfaces on said longitudinally movable table, rocker surfaces on said rocking table which are concentric with the axis of said centers, means including a master cam and a follower roller to rock said support, means including an adjustable rack bar on said longitudinally movable table and a gear segment on said rocking work support to control the rocking movement of the support, means to adjust the position of said rack bar to facilitate adjustment of the axis of the centers relative to the axis of rotation of the grinding wheel, an auxiliary rack bar associated with said rack bar, and means to adjust said auxiliary rack bar relative to said rack bar to eliminate backlash between the rack bar and gear segments.

13. In a grinding machine having a longitudinally reciprocable table, a rocking work support thereon, a rotatable work support including a headstock and a footstock center on said rocking work support, a pair of spaced transversely arranged rack bars on said longitudinally movable table, spaced gear segments on said rocking work support which mesh with said rack bars to facilitate controlling the rocking movement of said table, means including a master cam and a follower roller to rock said table, and means to adjust at least one of said rack bars transversely relative to said table to facilitate positioning the work axis relative to the axis of the grinding wheel.

14. In a grinding machine having a longitudinally reciprocable table, a rocking work support thereon, a rotatable work support including a headstock and a footstock center, a pair of spaced transversely arranged parallel rack bars on said longitudinally movable table, a pair of spaced gear segments on said rocking work support which mesh with said rack bars to facilitate controlling the rocking movement of said table, means to adjust at least one of said rack bars transversely relative to said longitudinally movable table to facilitate positioning the work axis relative to the axis of the grinding wheel, an auxiliary rack bar associated with each of said rack bars, said auxiliary rack bars meshing with said gear segments, and means to adjust the position of said auxiliary rack bars relative to said rack bars so as to eliminate backlash between the rack bars and gear segments.

CARL G. FLYGARE.